United States Patent
Lennon et al.

(10) Patent No.: US 7,359,574 B2
(45) Date of Patent: **\*Apr. 15, 2008**

(54) SYSTEM FOR OPTIMIZING ALIGNMENT OF LASER BEAM WITH SELECTED POINTS ON SAMPLES IN MALDI MASS SPECTROMETER

(76) Inventors: John J. Lennon, 2009 Hardwick St., Blacksburg, VA (US) 24060; Anthony J. Makusky, 234 Pennywinkle La., Gaithersburg, MD (US) 20878; Samuel G. Michael, 3708 Gawayne Ter., Silver Spring, MD (US) 20906

(\*) Notice: Subject to any disclaimer, the term of this patent is extended or adjusted under 35 U.S.C. 154(b) by 666 days.

This patent is subject to a terminal disclaimer.

(21) Appl. No.: 10/901,254

(22) Filed: Jul. 27, 2004

(65) Prior Publication Data
US 2004/0262514 A1 Dec. 30, 2004

Related U.S. Application Data

(63) Continuation of application No. 09/835,814, filed on Apr. 17, 2001, now Pat. No. 6,804,410.

(51) Int. Cl.
*G06K 9/40* (2006.01)
*G01J 3/28* (2006.01)
*G01N 24/00* (2006.01)

(52) U.S. Cl. .................. 382/274; 356/326; 436/173
(58) Field of Classification Search ............... 382/274, 382/275, 308, 312, 128, 151, 291; 250/281, 250/287, 288, 311; 436/47, 173, 174; 356/300, 356/303, 326, 451
See application file for complete search history.

(56) References Cited

U.S. PATENT DOCUMENTS 6,462,723 B1 \* 10/2002 Yamazaki et al. ........... 345/82

\* cited by examiner

*Primary Examiner*—Kanjibhai Patel
(74) *Attorney, Agent, or Firm*—Wayne P. Fitzmaurice

(57) ABSTRACT

A mass spectrometry apparatus uses image processing of output signals of a camera in a mass spectrometer to provide feedback for directing the laser. The present invention provides for the determination of where samples have actually been deposited on a plate, and for the selection of different points for each sample, based on its structure, at which to aim a laser, during the cycle period of the mass spectrometer. Such feedback information increases the likelihood that the laser impinges samples and provides useful data.

12 Claims, 8 Drawing Sheets

Prior Art

Prior Art

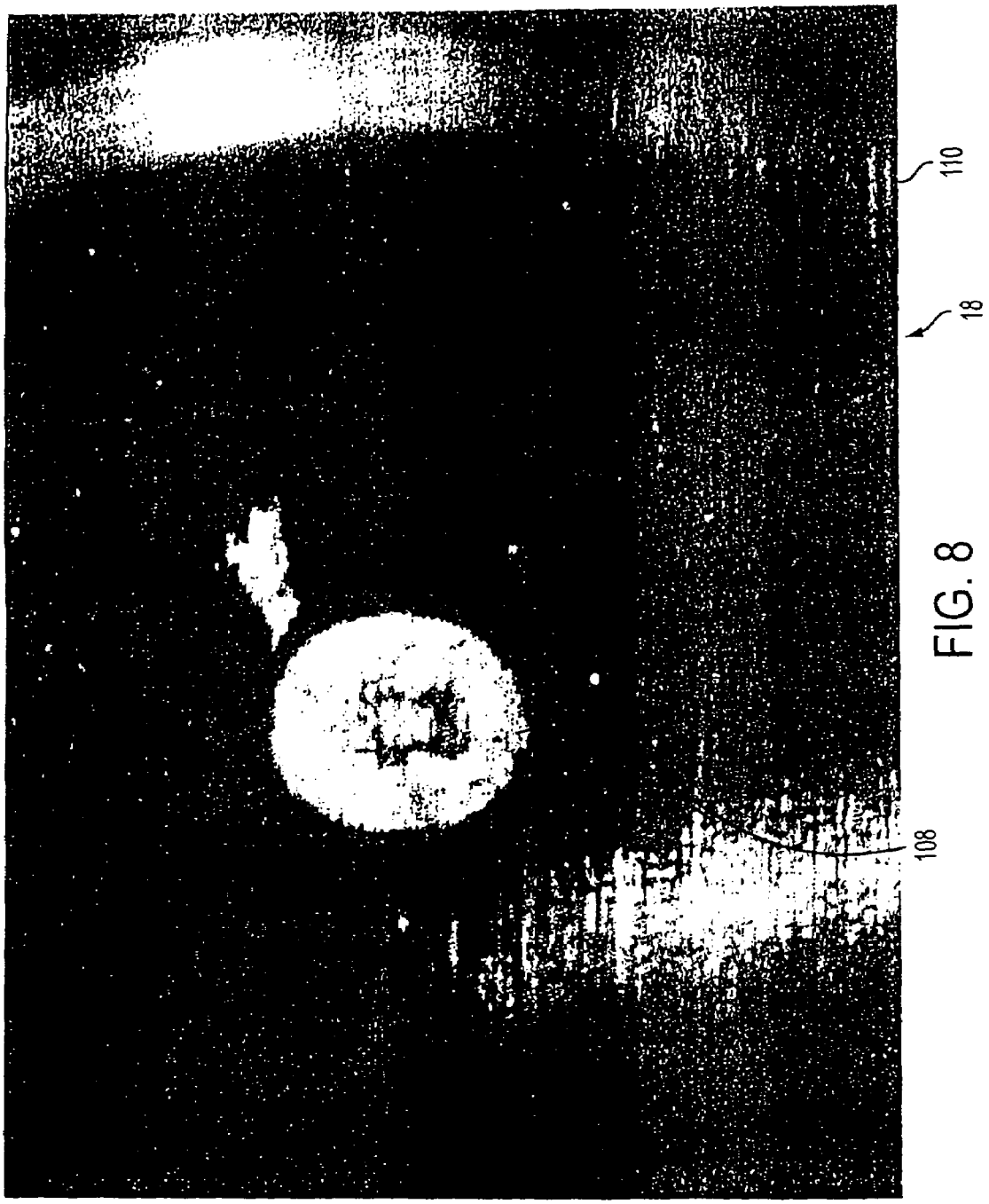

SYSTEM FOR OPTIMIZING ALIGNMENT OF LASER BEAM WITH SELECTED POINTS ON SAMPLES IN MALDI MASS SPECTROMETER

RELATED APPLICATIONS

This application is a continuation of Ser. No. 09/835,814, filed Apr. 17, 2001, now U.S. Pat. No. 6,804,410, issued Oct. 12, 2004.

CROSS-REFERENCE TO RELATED APPLICATION

Related subject matter is disclosed and claimed in U.S. patent application Ser. No. 09/644,780, filed Aug. 24, 2000, now U.S. Pat. No. 6,508,986, the entire content of said application being expressly incorporated herein by reference. The current application is a continuation of U.S. patent application Ser. No. 09/835,814, filed Apr. 17, 2001, now U.S. Pat. No. 6,804,410 B2.

BACKGROUND OF THE INVENTION

A. Field of the Invention

The invention relates to a method and apparatus for improving mass spectrometry analysis of samples. Specifically, the invention relates to a method and apparatus for mass spectrometry analysis which allows for more precise alignment of a laser with samples, as well as for selection of impingement point(s) on each sample depending on the crystalline structure and other characteristics of the sample, to improve the quality of the data collected by a mass spectrometer.

B. Background Information

Mass spectrometry devices measure the molecular mass of a molecule by measuring the molecule's flight path through a set of magnetic and electric fields. Such devices are well known and are widely used in the field of biomolecular research. In proteomics research, for example, mass spectrometry is used to identify proteins.

Proteins are typically separated from one another by electrophoresis, such as the techniques described and claimed U.S. Pat. No. 5,993,627to Anderson et. al. (hereinafter referred to as the Anderson et. al. patent), which is incorporated herein by reference in its entirety. For instance, as set forth in the Anderson patent, a tissue sample is first subjected to a first dimension electrophoresis process where groups of proteins are separated linearly within a tubular gel filled column. The first dimension separation of proteins is then inserted along an edge of a flat planar gel slab and subjected to a second dimension of electrophoresis, thereby generating a two dimensional pattern of spots formed by clusters of proteins that have moved to respective isoelectric focusing points. Thereafter, selected proteins are excised from the second dimension gel slab for further study. The selected excised spots are next prepared for analysis using, for instance, mass spectrometry.

An increasingly popular technique for studying biological molecules is the use of a matrix-assisted laser desorption ionization (MALDI) mass spectrometry apparatus wherein a biological sample such as an above-referenced excised spot is embedded in a volatile matrix which is subsequently vaporized by an intense laser emission. One such MALDI mass spectrometry apparatus is a MALDI-TOF apparatus (TOF is time-of-flight spectrometry). In the field of proteomics, mass spectrometry, and in particular, MALDI-TOF techniques are used to determine the molecular weight of peptides produced by digestion of isolated proteins. One such MALDI-TOF apparatus is VOYAGER DE STR Biospectrometry Workstation manufactured and sold by APPLIED BIOSYSTEMS.

The drawbacks of conventional methods for analyzing samples using mass spectrometry such as in proteomics research will become apparent from the following description of a conventional MALDI-TOF apparatus. FIG. 1 depicts a generic MALDI-TOF apparatus that includes a frame 1 that supports the electronic and computer equipment necessary to control a laser 5. The laser 5 is aimed at a fixed location in a positioning mechanism 10. The positioning mechanism 10 includes means (not shown) for positioning a sample in the line of fire of the laser 5. Typically, in a MALDI-TOF apparatus, the laser is fixed in place and the sample is moved into position for analysis.

The MALDI-TOF apparatus comprises a small removable sample plate 15, shown in FIGS. 2 and 3, that fits into the positioning mechanism 10. Typically, the sample plate 15 is insertable into a slot 20 in the positioning mechanism 10 of the MALDI-TOF apparatus and is thereafter held in a specific orientation within the positioning mechanism 10 for sample analysis. The sample plate 15 typically holds a plurality of discrete samples 16 on one surface thereof, with the samples 16 being spaced apart from one another, as shown in FIG. 3. The sample plate 15 includes guide members 15a, guide holes 15b and alignment pin 15d that are used by corresponding members (not shown) within the positioning mechanism 10.

The MALDI-TOF apparatus generally comprises a camera (not shown) in the positioning mechanism 10, which includes the sample plate 15 in its field of view, as well as the video monitor 25 depicted in FIG. 1. Thus, the MALDI-TOF apparatus can generate an analog output corresponding to the field of view to generate a display of the sample plate 15. Using the display, an array of Cartesian coordinates (X,Y) can be generated which corresponds to respective target sample areas on the sample plate 15. The sample plate 15 can then be moved automatically with respect to the line of fire of the laser 5 using these coordinates.

The samples 16 are loaded onto the sample plate 15 by a separate device or robotic apparatus that is typically manufactured and sold with each specific mass spectrometry apparatus. The robotic apparatus includes a recess that retains the sample plate 15 in position for sample loading, a first arm that moves back and forth along an X axis, and a second arm that moves along a Y axis defined along the length of the first arm. The second arm supports a pipette tip that is used to spot samples on the sample plate 15 as it is moved by the first and second arms.

Typically, an array of samples 16 are spotted on the sample plate 15 at predetermined locations, as depicted in FIG. 3. After the array of samples 16 are loaded onto the sample plate 15, the sample plate 15 is inserted into the slot 20 of the MALDI apparatus. Using the imaging system provided by the computer as indicated at 25, which is focused on the sample plate 15 within the MALDI apparatus, in combination with the positioning mechanism 10, the laser beam from the laser 5 can be aimed, one by one, at the sample(s) on the sample plate 15 in accordance with the array of coordinates.

In accordance with conventional methods for mass spectrometry analysis, the locations of the samples 16 are pre-programmed into the computer that controls the MALDI-TOF apparatus so that during the analysis of the samples, the positioning mechanism 10 automatically repositions the sample plate 15 into the line of fire of the laser 5. For example, a user enters via a mouse, keyboard or other input device an array of X-Y coordinates corresponding to sample positions on a sample plate. Thus, if any of the samples 16 on the sample plate 15 were not properly deposited in the target positions by the robotic apparatus, the laser 5 is not likely to hit those samples. More specifically, on the sample plate 15 depicted in FIG. 3, a 10×10 array of samples is positioned on the upper surface at spaced apart intervals. The positioning mechanism 10 moves into a target position with respect to centers of the desired or target location of each sample or spot. The desired location of each spot assumes that center of each of the spots in the 10×10 array is constant and therefore coincides with the centers 20 of the target areas 18, as depicted in FIG. 4.

Unfortunately, there are several shortcomings associated with the above-described robotic apparatus. Although the positioning mechanism 10 within the MALDI apparatus has positional accuracy with respect to movement of the sample plate 15, the robotic apparatus typically sold with a MALDI apparatus is not as precise with respect to accurate spotting or depositing of samples on the sample plate 15. Specifically, the spots 16 in a 10×10 array of samples are not centered on the desired center 20 targeted by the positioning mechanism 10. The array of 10×10 samples may have some samples (e.g., the sample 16a in FIG. 4) that are substantially accurately centered, and other samples (e.g., samples 16b and 16c) that are off center by as much as half the width of the sample. In addition, the crystalline structures of the samples can affect the manner in which they are deposited on the sample plate and therefore cause a certain degree of offset from the actual area of deposit for a sample and the target area for the sample plate.

During mass spectrometry analysis, the laser 5 is operated to impinge approximately five or six pre-determined locations relative to the pre-programmed centers 20 of each of the sample positions 18 on the sample plate 15 (e.g., points at predetermined positions on a circle surrounding the center 20 of a sample position). Since each impingement can be approximately one minute in duration, and sample plates can have arrays on the order of 100 to 144 samples, the mass spectrometry apparatus typically requires several hours to analyze an array of samples on the sample plate 15. If the laser does not impinge samples due to the afore-mentioned inaccuracies in depositing the samples on the sample plate, most of the data collected during this time-consuming process can be worthless.

Since the yield of useful output data from mass spectrometry equipment per each lengthy analysis period is relatively low, research laboratories have attempted to increase the data yield when collecting data during a single analysis period by using several mass spectrometers operating in parallel with respective sample plates. Mass spectrometers, however, are very expensive. Acquiring and operating several mass spectrometers at one time in an attempt to collect more data increases research costs considerably. Furthermore, a statistical average of as much as 50% of the data collected by the multiple mass spectrometers is essentially useless for the reasons stated above (i.e., from laser emissions that did not actually impinge samples 16). Accordingly, a need exists for an improved mass spectrometry analysis system that is cost effective and yields more reliable data.

SUMMARY OF THE INVENTION

In accordance with the present invention, a system is provided for precisely aligning the laser of a mass spectrometry apparatus with the samples on a sample plate to obtain more accurate sample data for improved mass spectrometry analysis.

In accordance with another aspect of the present invention, the system employs images as feedback to provide value-added direction to the positioning mechanism in the mass spectrometer apparatus.

In accordance with another aspect of the present invention, the system employs frame grabbing and image processing software to analyze images of individual samples and to select areas for each sample at which to aim a laser for mass spectrometry analysis, depending on the characteristics of that sample.

BRIEF DESCRIPTION OF THE DRAWINGS

FIG. 8 is an electrophoresis gel image depicting a sample at a MALDI position on a sample plate.

DETAILED DESCRIPTION OF THE PREFERRED EMBODIMENTS

Figure 5:
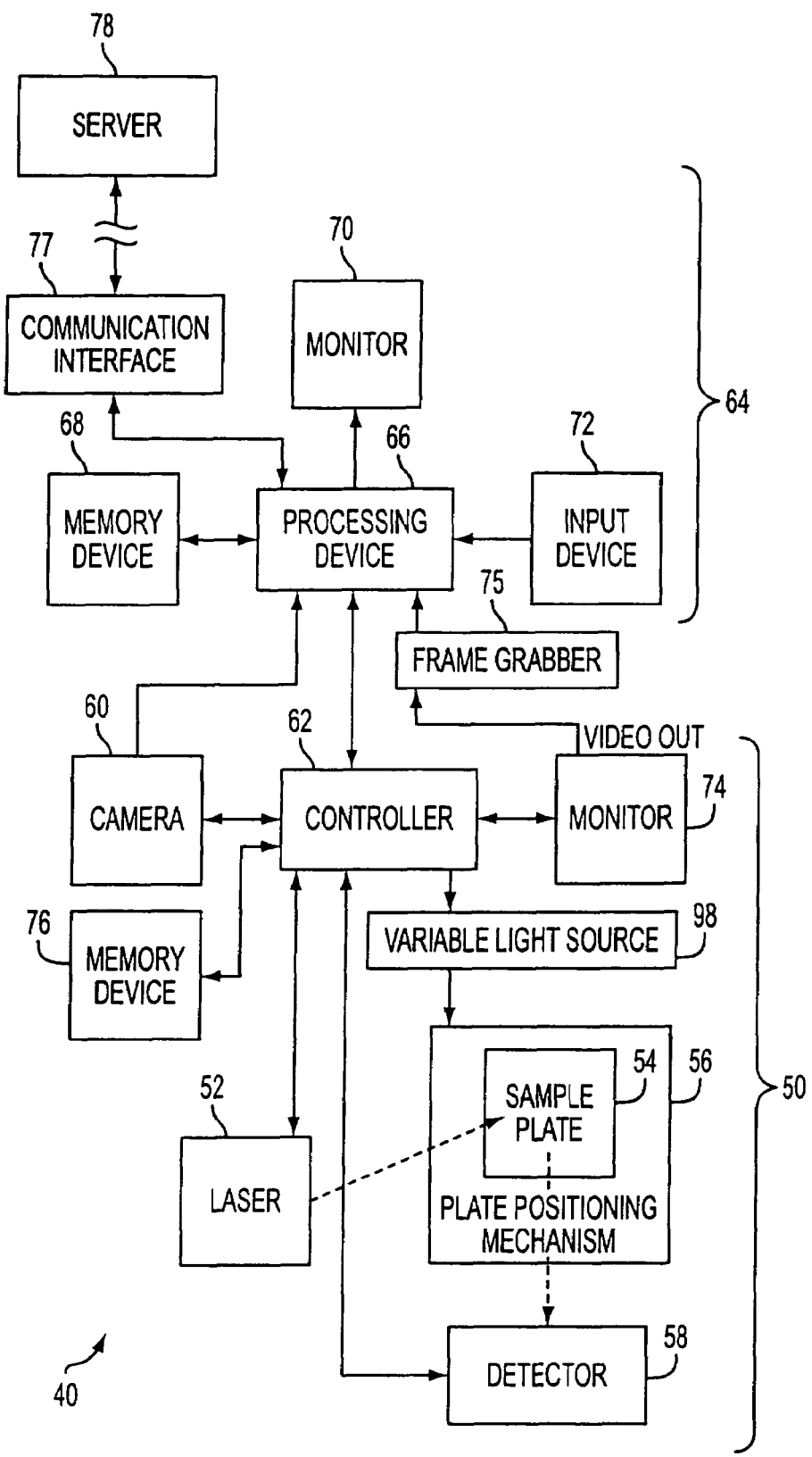
FIG. 5 is a block diagram of an apparatus for mass spectrometry analysis constructed in accordance with an embodiment of the present invention.
Figure 6:
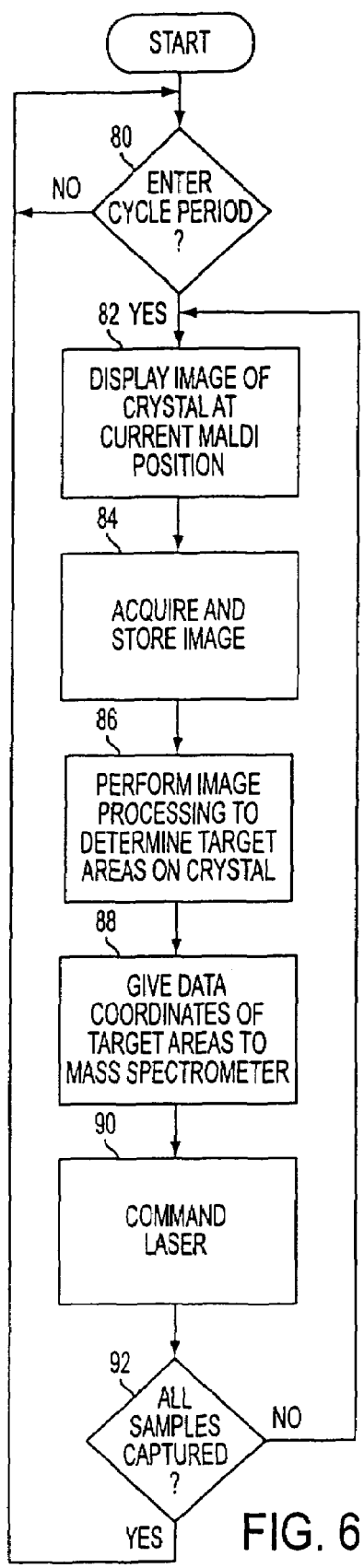
FIG. 6 is a flow chart depicting a sequence of operations for operating an apparatus for mass spectrometry analysis constructed in accordance with an embodiment of the present invention.

In accordance with the present invention, a method and apparatus for mass spectrometry analysis are provided which allow for more precise alignment of a laser with samples via selection of impingement point(s) on each sample depending, on the crystalline structure and other characteristics of the sample, to improve the quality of the data collected by a mass spectrometer. FIG. 5 is a block diagram depicting a number of the components in a mass spectrometry apparatus 40 constructed in accordance with the present invention. FIG. 6 is a flow chart depicting an illustrative sequence of operations for using the mass spectrometer apparatus depicted in FIG. 5 in accordance with the present invention.

As shown in FIG. 5, the mass spectrometry apparatus 40 preferably comprises a mass spectrometer 50 and a programmable computer such as a personal computer indicated generally at 64. The mass spectrometer 50 can be a commercially available mass spectrometer such as the aforementioned VOYAGER, the software for which has been modified in accordance with the present invention, or a mass spectrometer that has been programmed specifically in accordance with the present invention. The personal computer 64, which can be essentially any personal computer, operates in conjunction with a frame grabber 75 such as the National Instruments model 1407. For each MALDI position on a sample plate 54, an image is acquired using the frame grabber 75 and stored on the personal computer 64 for image processing in accordance with the present invention. It is to be understood, however, that essentially any programmable computer can be used to implement the present invention. Further, the personal computer can be the same computer that operates the mass spectrometer 50 if provided with image acquisition software and frame grabber drivers needed to operate in accordance with the invention as described below.

With continued reference to FIG. 5, the mass spectrometer 50 comprises a laser 52 operable to emit a beam of laser radiation toward the sample plate 54 on which a number of samples have been deposited for analysis. Once the matrix in which the sample analyte molecules are distributed evaporates, the excited analyte molecules ionize. Data collection and recording of ionized analyte molecules and fragments is provided by a detector 58 such as a time of flight mass analyzer. The sample plate 54 can be moved with respect to the laser 52 via a plate positioning mechanism 56. The mass spectrometer apparatus 50 preferably further comprises a camera 60, a controller 62, a monitor 74 and a memory device 76. The field of view of the camera 60 includes the sample plate 54. The controller 62 is programmed to coordinate the operations of the plate positioning mechanism 56, the laser 52, the camera 60 and the detector 58. The controller 62 allows for the image obtained via the camera 60 to be provided to the monitor 74, which then provides the image to the frame grabber 75 via its video output. The VOYAGER mass spectrometer is referenced herein by way of an example. It is to be understood that different types of mass spectrometers having different types of lasers can be used with different types of matrices.

The controller 62 is operated in conjunction with an application program for operating the mass spectrometer 50. In accordance with the application program, the controller 62, or other programmable device used to control the mass spectrometer 50 such as the processing device 66, generates a number of display screens, for example, on the computer monitor 70 to provide a graphical user interface for controlling various operations of the mass spectrometer apparatus 50. For example, using an input device 72 such as a mouse, touch screen, keyboard, and the like, a user can enter commands that will be provided to the controller 62 to operate the camera 60, the plate positioning mechanism 56 and the laser 52. As described below, coordinates can be provided to the controller 62 to operate the laser 52. In addition, the light source 98 for the camera, which is preferably variable, can be controlled to selectively increase and decrease brightness to determine the effect on image quality of an acquired image of a sample on the plate 54.

The image obtained from the camera 60 can be low quality (e.g., 8-bit resolution) and the present invention still yields significantly improved mass spectrometry results. A higher quality camera (e.g., a camera with 10, 12, 14 or 16-bit resolution) can be used with the mass spectrometer. Alternatively, the image from the camera 60 can be provided directly to the frame grabber 75, bypassing the monitor 74.

With continued reference to FIG. 5, the image of a crystal at the current MALDI position on the sample plate 54 is preferably provided to the monitor 70 of the personal computer 64 via the frame grabber 75, as well as being provided to the monitor 74. The processing device 66 of the personal computer 64 is preferably provided with an image capture application. For example, a program can be developed using LabVIEW, a programming environment developed by National Instruments. The program accesses the hardware of the frame grabber 75 to acquire the image therefrom. It is to be understood that different hardware and/or software can be used to acquire and process images. For example, different programming environments can be used to access different types of frame grabbers.

Each image is preferably saved as a TIFF file (e.g., in the memory device 68 depicted in FIG. 5), although any image format can be used such as GIF, JPEG, and so on. The TIFF format is advantageous because it is platform-independent and therefore can be used on many existing operating systems. Further, use of the TIFF format allows for the addition of tags to help define various parameters for each image. Each image is stored, for example, in an 8-bit gray scale format. Color or finer gray scales can be used to distinguish between different types of crystals and to determine which crystal types produce the best data. This is advantageous because different matrices may have different preferred crystal types.

Each stored image is then sent to a server 78 via a communication interface 77, as shown in FIG. 5. The server 78 is preferably an AlphaVMS server available from Compaq Computer Corporation, Houston, Texas, and is the computer at which image processing in accordance with the present invention is performed. The type of computer or operating system, however, is immaterial as long as the computer has the ability to acquire and process an image. The AlphaVMS server is advantageous because it has an established library of image processing techniques using Kepler software. Kepler software is generally described in Richardson et al, "Carsinogenesis", Vol. 15, Issue No. 2, Pgs. 325-329 (1994), which is incorporated herein by reference. Alternatively, the computer (e.g., the personal computer (PC) 64) that acquires the image can also perform image processing, as long as it is capable of performing both operations. For example, the PC 64 or the mass spectrometer 50 can be provided with a printed circuit card that performs image processing such as the PC card and associated software available from Matrox Electronic Systems of Dorval, Canada. In accordance with another embodiment of the present invention, the camera output can be provided to the PC 64 or other image processing device such as the aforementioned PC card and then sent to the monitor 70. Thus, the monitor 70 displays only the processed image.

Figure 1:
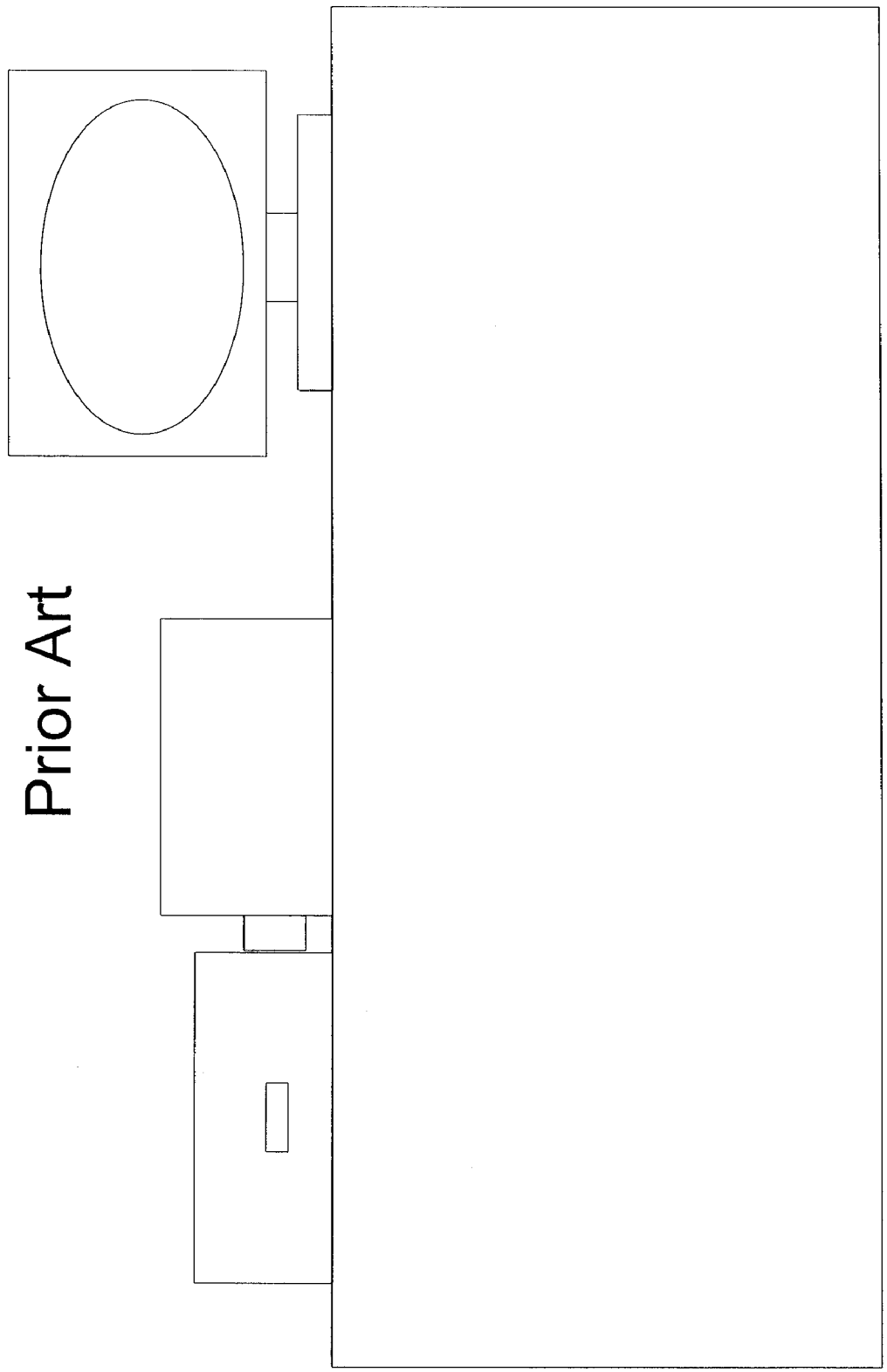
FIG. 1 is a side schematic view of a mass spectrometry apparatus.
Figure 2:
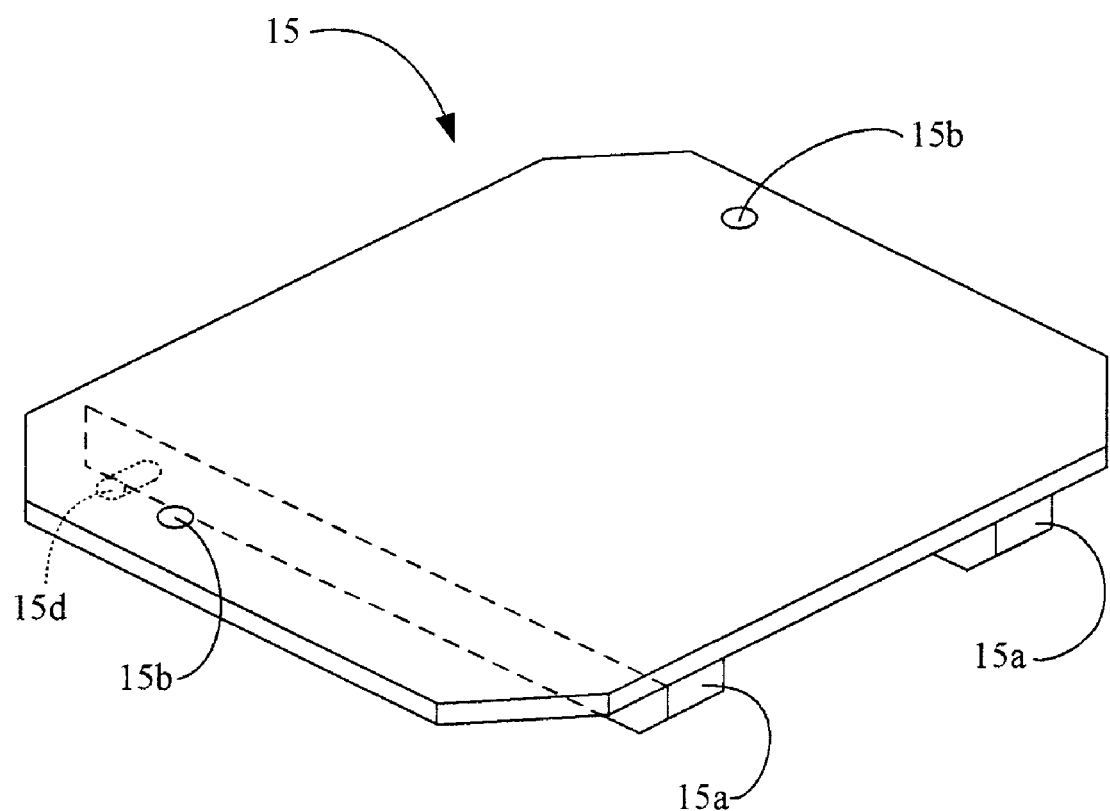
FIG. 2 is a perspective view of a sample plate for samples to be analyzed in the mass spectrometry apparatus depicted in FIG. 1.
Figure 3:
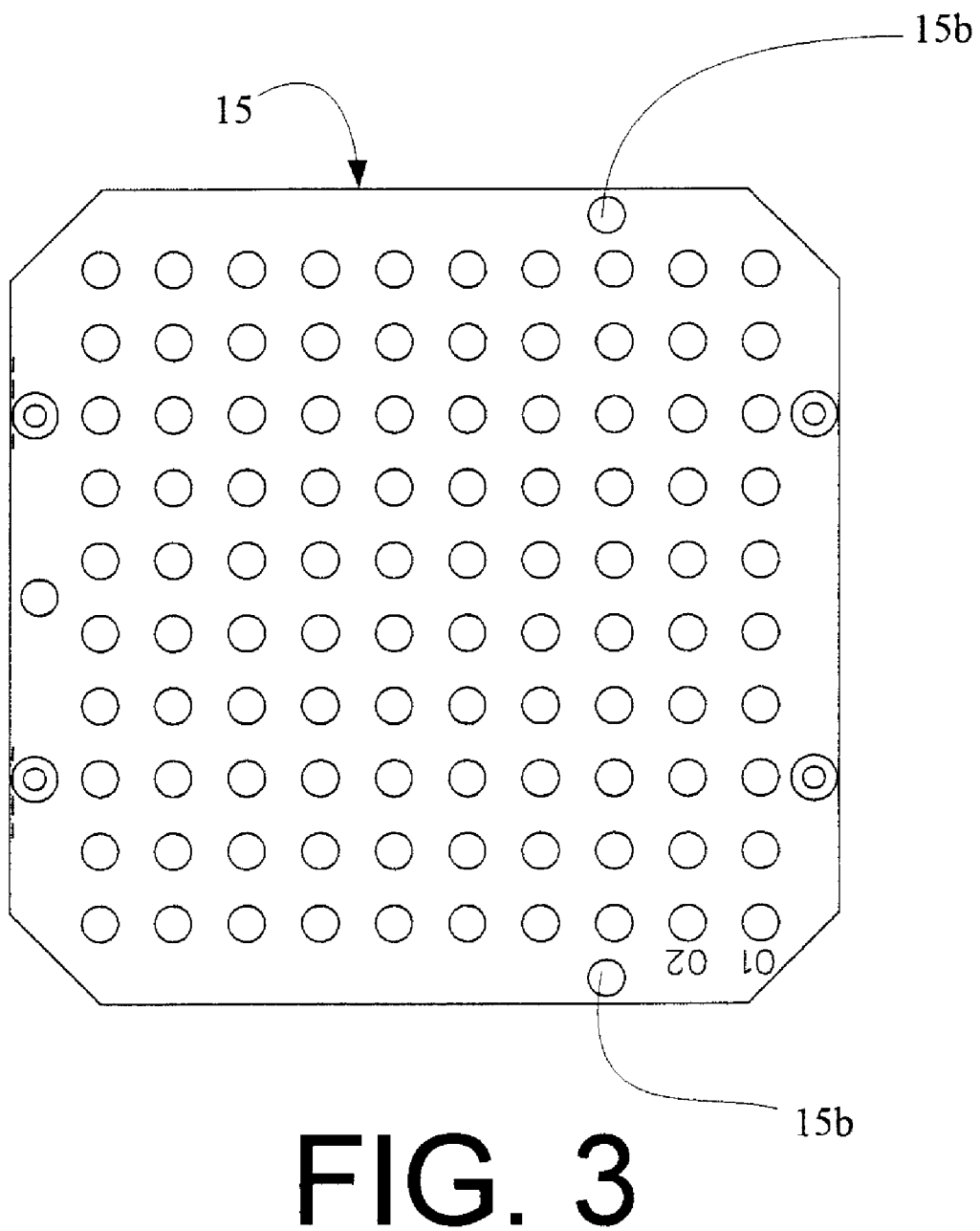
FIG. 3 is a top view of the sample plate in FIG. 2.
Figure 4:
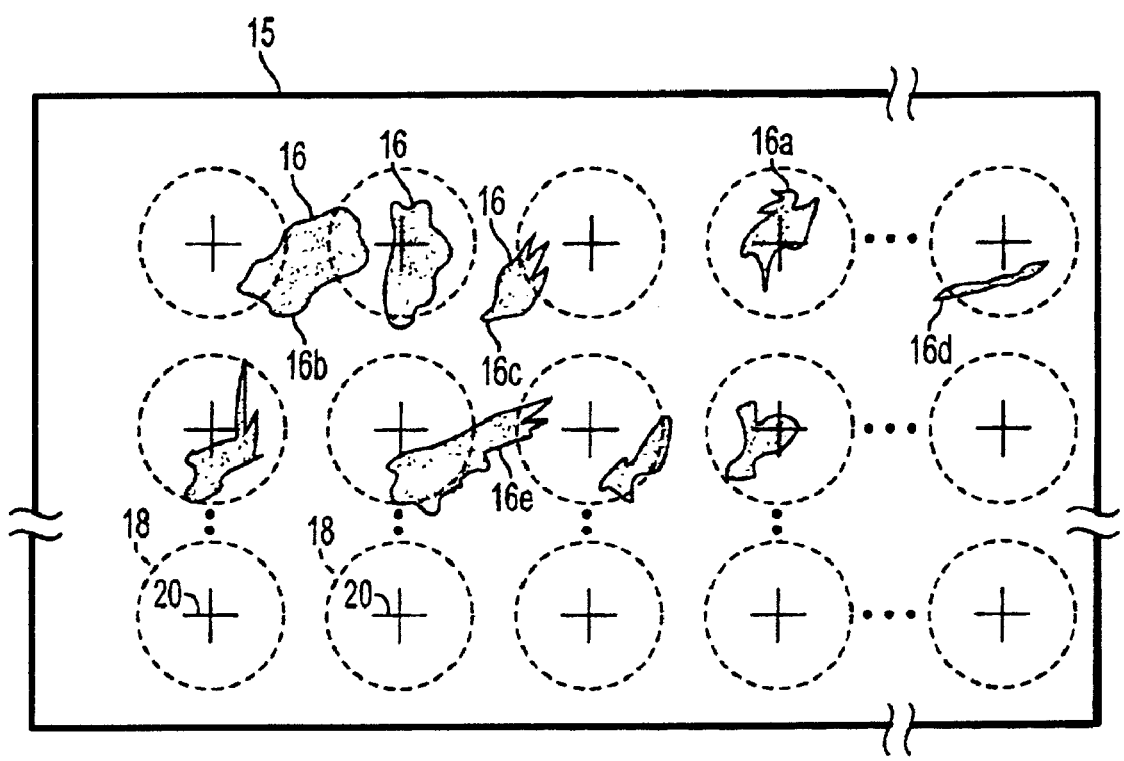
FIG. 4 is a partial top view of a sample plate depicting exemplary samples deposited thereon.

In accordance with one embodiment of the present invention, the image processing of the present invention involves determining the approximate center of each crystal on the sample plate 54 by taking corresponding signals and averaging their coordinates to give a single coordinate that is the theoretical center and theoretically the best location for producing useful mass spectrometry results. The mass spectrometer 50, and the image processing software of the present invention (e.g., the Kepler software or other image processing software provided at the server 78) preferably employ a framework such as a grid image employing Cartesian coordinates for identifying specific areas on an image and, correspondingly, on the sample plate 54 (e.g., using (X,Y) coordinates). The set of coordinates can then be used to control the firing of the laser 52 at, for example, five or six locations around the approximate center of each crystal. Alternatively, as described in more detail below with reference to FIG. 7, the images of each crystal can be processed further to more specifically select points on a crystal at which to aim a laser based on different crystalline characteristics. In either embodiment, the mass spectrometer 50 yields more useful data than the conventional method of selecting points of laser impingement on a sample plate 54 by merely using spot locations (e.g., the centers 20 of spot locations 18) which may not have crystals deposited therein at all, as shown in FIG. 4.

The disadvantages of the conventional method of using the centers 20 of spot locations as points of laser impingement is more clearly depicted in FIG. 8. FIG. 8 is an actual image of a crystal 108 at a MALDI spot location 18. The image provides a view of only a portion of the spot 18, as evidenced by only a portion of the border 110 of the spot appearing in the image. Thus, the exemplary crystal 108 represents only a small area of the spot 18. It can therefore be understood how merely using the center 20 of a spot location for laser impingement will mostly likely not involve a sample to yield useful mass spectrometry data.

The results of the image processing (e.g., a set of coordinates corresponding to selected points on crystals on the sample plate 54) are preferably stored in a file format that is compatible with the application software that controls the MALDI device. The MALDI device control software can, for example, control stepper motors or servo motors for movement of the MALDI motors to get to a selected position on the plate and thereby place a desired crystal in the path of the laser. The file format can vary as between MALDI files, but is preferably a text-based file with a series of coordinates that specify where the laser 52 will fire.

A number of software techniques are available to facilitate the process of integrating the image processing software of the present invention with the existing software used to control the MALDI instrumentation. There are other methods, as well, such as internal messaging. For example, some programs respond to certain messages sent to them from other programs. If the program allows for messaging, the image processing software of the present invention can send 'messages' to the MALDI software to operate as desired.

As stated previously, the coordinates determined by the image processing are sent to the MALDI stage motors, which use the coordinates to move the MALDI plate 54 on the stage 56 to target areas on the crystal in the spot 18 at the current plate position. The coordinates supplied by the image processing software are relative to the current target position of the plate 54. The MALDI device control software manages the global coordinate scale regarding the position of each target in relation to the area of the target plate 54. The laser 52 can then be fired onto the plate 54, and the crystal is ionized. The MALDI mass spectrometer 50 determines whether acceptable data resulted from the measurement of the ions ejected using its existing conventional software. If no acceptable data is obtained, the process is repeated with the coordinates taken from the second preferred crystal from the processed image. The MALDI plate 54 is repositioned and the laser 52 is fired. Once acceptable data has been obtained, the MALDI plate 54 is moved until the next spot is positioned in view of the camera 60 and the next image is processed for the crystal at the next plate position. This process repeats itself for the number of targets to be analyzed.

As stated previously in connection with FIG. 4, in conventional mass spectrometers, a user enters an array of X-Y coordinates corresponding to sample positions on a sample plate. The array of X-Y coordinates is created with the assumption that the samples 16 are located in the centers 20 of target sample areas 18 on the sample plate. Thus, if any of the samples 16 on the sample plate 15 were not properly deposited in the target positions 18 by the above-described robotic apparatus, the laser is not likely to hit those samples.

While the monitor and operating application program of a conventional mass spectrometer permit a user to view the sample plate, the input control data entered via input device is not based on such value-added data as the actual positions of the samples on the sample plate, as obtained from image processing in accordance with the present invention.

In accordance with the present invention, and in contrast with conventional mass spectrometers, the images provided to the frame grabber 75 directly, or indirectly, from the monitor 74 via the camera 60, provide feedback for the selection and entry of Cartesian coordinates (X,Y), for example, with which to control the movement of the sample plate 54 with respect to the line of fire of the laser 52. Other methods for providing directions to the plate positioning mechanism 56 can be used such as the entry of polar coordinates, a roster, among others. The analog monitor signals then undergo image processing by the server 78 or processing device 66 in accordance with the present invention. As stated above, the present invention allows for frames of image data (e.g., samples on a sample plate) to be captured or grabbed at selected instances in time. This frame grabbing operation is used to provide feedback information to the mass spectrometer 50 that increases the likelihood that the laser 52 impinges samples deposited on a plate 54, even though the samples are not deposited on predefined target areas on the plate. Further, the laser 52 can be dynamically directed on a sample-by-sample basis during the analysis period.

The steps illustrated in FIG. 6 are preferably performed during the cycle time of the mass spectrometer 50 (e.g., the time period during which the mass spectrometer is preparing the chamber for subsequent laser desorption and ionization), as indicated at block 80. The cycle time of a mass spectrometer 50 can be on the order of 30 minutes. In a preferred embodiment, the personal computer 64 is programmed to operate as a single channel frame grabber. The mass spectrometer 50 provides a signal from the camera 60 to the monitor 74 to display the image of the crystal at the current MALDI position (block 82) The VIDEO OUT port of the monitor 74 can be connected to an input port on the personal computer 64. The image of the crystal at the current MALDI position is therefore visible on both the output monitor 74 and the monitor 70 of the personal computer 64 with the frame grabber software.

For each MALDI position, an image is acquired using the frame grabber and stored on the local personal computer (e.g., memory device 68), as indicated in block 84 in FIG. 6. Each stored image is then preferably sent to a server 78 (e.g., an AlphaVMS server) via a communication interface 77 provided on the personal computer 64. The image is then processed at the server 78 to locate samples or crystals and to determine which areas of each crystal should be targeted by the MALDI for analysis (block 86).

A number of different processing steps can be used in different sequences to perform the image processing of the present invention via the processing device 66 and the camera output data captured as frames on the video monitor 70. Exemplary processes are described below in connection with FIG. 7. It is to be understood that the selection of points on a sample that are to be impinged with radiation, depending on the crystalline structure of the sample, can be performed manually by a user. For example, a user can view the images on the monitor 70 corresponding to the output of the camera 60 and then select and manually enter these coordinates for individual samples.

The results of the processing are stored in a file format compatible with the software that controls the MALDI so that the determined coordinates can be used. The MALDI mass spectrometer 50 uses the coordinates determined by the image processing to target areas on the crystal at the current plate position. As indicated at block 88 in FIG. 6, the data relating to the locations of the samples on the sample plate 54 (e.g., the coordinates that are to be irradiated) are provided to the mass spectrometer 50. The controller 62 uses this data to operate the laser 52 and the plate positioning mechanism 56 (block 90). The next image is then processed for the crystal at the next plate position and the process is repeated (block 92).

With reference to block 86 in FIG. 6, the image data of at least one sample is processed to determine the characteristics of the crystalline structure of that sample and to select optimal points on that structure at which to direct a beam of laser radiation. When samples of proteins dry on a sample plate, they exhibit certain crystalline structures, depending on how they were prepared, that are considered to ionize better than other structures. The mass spectrometry apparatus 40 is operated in accordance with the present invention to identify these structures and to select optimal points thereon at which to direct the laser 52. By way of an example, hair-like protein crystals (e.g., sample 16d in FIG. 4), or crystals that have finger-like appendages crystals (e.g., sample 164 in FIG. 4), that are relatively thin will vaporize in response to a laser emission better than crystals that are globoids and are thicker crystals (e.g., sample 16b in FIG. 4).

As stated previously, imaging processing can be used to determine the center of each crystal by taking each of the crystal signals and averaging their coordinates to give a single spot that is the theoretical center and theoretically the best location for laser impingement to produce desirable data results. Points can then be targeted by the laser 52 around the theoretical centers of samples or crystals. Other methods, however, can be used for image processing at the server 78 to determine which areas of a crystal should be targeted by the MALDI device 50 for analysis.

As mentioned before, the significant problem concerning image processing is the image quality itself. Better results can be obtained with higher quality images (e.g., by using a higher resolution camera). In addition to image resolution, a key component for high image quality is lighting. Another challenge to obtaining high image quality is the light source for the acquired image. Inside the MALDI device 50, a camera 60 is provided, as well as the light source 98, and both are targeted at the current plate position. This is a variable light source in that it can be altered via the controller 62 to increase or decrease the brightness. It is to be understood that this light source 98 was implemented with the idea that the image had to be visible on the monitor 74 at all times, and not with the assumption that the image on the monitor would also be passed back to a computer for processing. The image obtained has a high amount of reflection, both on the crystals and on the MALDI plate itself. This reflection is determined by the position of the light source 98. In other words, the lighting of the crystal is not uniform. In accordance with another embodiment of the present invention, the lighting angle and intensity is modified and controlled via the controller 62. Polarized light or a polarizing filter can be added for better scanning of the crystals or for crystal determination. Also backfield or phase contrast lighting can be used.

The image processing technique used is preferably a series of thresholds, erosions and dilations. In accordance with an embodiment of the present invention, spots on the crystal that appear to be the largest are located, assuming that, in a larger crystal area, more sample is present. To implement this technique, the image is thresholded to a certain level to determine the largest spots. The threshold level is based on the lighting of the image, which was not uniform on the crystal. Also, the position of the light can cause reflection on the crystals, giving some areas of the image a higher intensity. These areas with the highest intensity are the ones selected by the processing device. With a uniform light source positioned to reduce reflection, it is possible to obtain a better image, and therefore a more accurate representation of intense crystal location. Multiple scans can also be taken with the light in a different position or using a different type of lighting. Each scan is then processed. The results can then be merged or the results from each crystal can be made cumulative between all of the scans to get an average value for each crystal. This reduces variability and reflection and refraction irregularities.

Another implementation for image processing in accordance with the present invention is to look for markers in an image, which generally specify where sample may be. Different matrices may result in different markers or the same marker meaning different indications. This is accomplished using a series of dilations to look for finger-like branching of a crystal structure. Once again, a threshold is taken, and then the image is dilated several times using the image processing software (e.g., at the server 78). Several particle filters can be applied during image processing to eliminate objects based upon certain parameters. For example, in the case of dust, if a sample is believed to be larger than 5 pixels, a filter is run that removes all objects smaller than 5 pixels. This processed image was then analyzed as to its location on the image to determine its coordinates, which are sent to the MALDI device to target the laser to the crystal.

Figure 7:
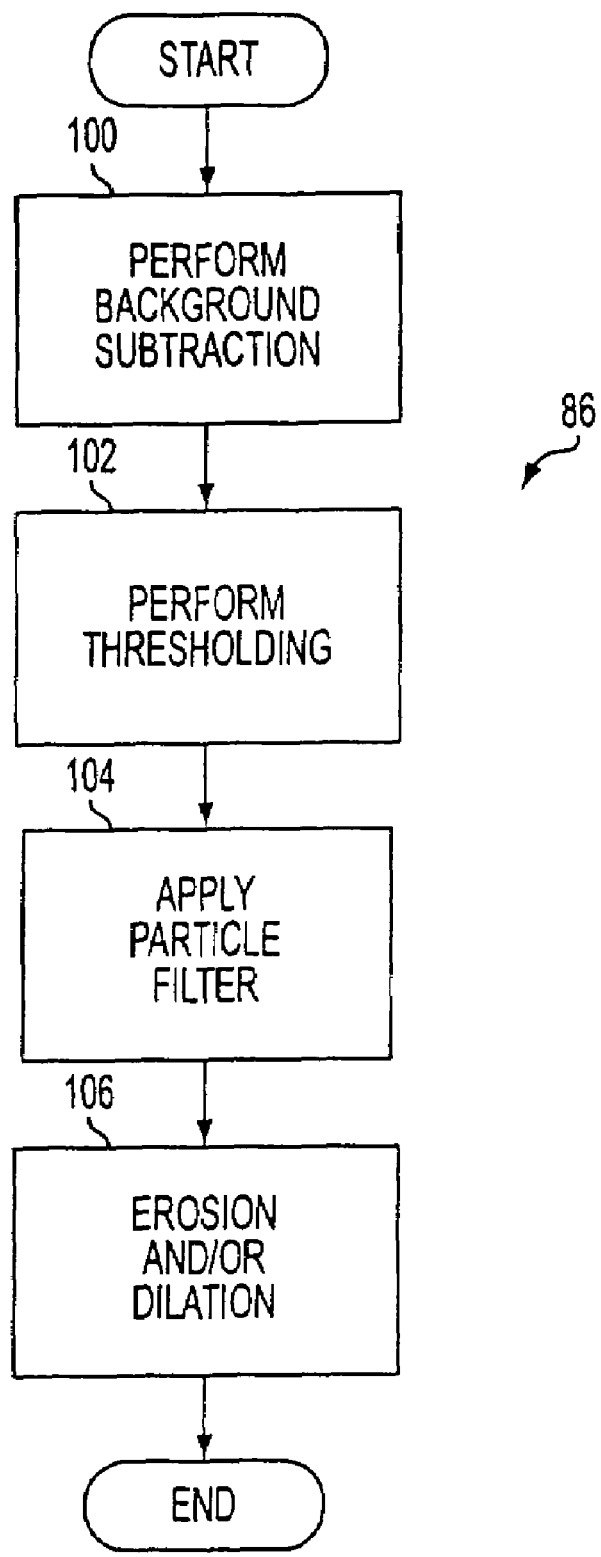
FIG. 7 is a flow chart depicting a sequence of operations for performing image analysis on samples to locate optimal areas of laser beam impingement in accordance with an embodiment of the present invention.

FIG. 7 provides an illustrative sequence of steps for locating an optimal point(s) for laser impingement of a sample. As indicated at 100, a background subtraction is performed to remove pixels corresponding to unwanted background data such as the grid image that can be used to provide coordinates in an image frame. Thresholding is also performed to further subtract unwanted images. For example, an 8-bit resolution images can be reduced to binary images to separate dark pixels that may correspond to the samples from unwanted light pixels that correspond to spaces between crystals (block 102). Thresholding can performed with higher image resolutions, in which case a range of pixel values correspond to different levels of brightness. Thus, a brightness level can be selected, and pixels having higher levels of brightness can be subtracted from an image while darker pixels can remain.

With continued reference to FIG. 7, the image frame captured from the monitor 70 can be subjected to a particle filter that eliminates pixels corresponding to an area of mass that is less than a selected criteria (block 104). For example, the processing device 66 can be programmed to analyze the values of groups or patterns of adjacent pixels, for example, to determine to what extent clusters are occurring in an image frame. Some clusters can be eliminated from the image frame if they do not comply with at least a minimal area or other criterion indicating the presence of a crystal in an image. Clustering is useful because the centroid of a cluster can be determined. The centroid can indicate whether the cluster corresponds to a finger-like sample crystal or to a globoid-type sample crystal in an image.

With reference to block 106 in FIG. 7, one or a series of erosion or dilation processing steps, or a combination of these two steps, can be performed on an image frame to facilitate the determination of the shape of a crystal represented by a number of pixels in an image. For example, an erosion step can cause the removal of pixels representing fingers or appendages from among a group of pixels in an image to make the corresponding crystal structure to appear as a large mass. As stated previously, thin or finger-type crystals can vaporize better and yield better data when impinged by a beam of laser radiation than crystals having larger mass. Accordingly, dilations that enlarge an image, and that allow for gaps in pixel data to be filled in, can reveal clusters corresponding to respective crystal structures.

Once a cluster of pixels has been identified as a crystal structure, one or more points are selected, depending on that structure, for subsequent impingement with a beam of radiation. The coordinates for these points are then provided to the controller 62 of the mass spectrometer for controlling the laser 52.

In accordance with another aspect of the present invention, libraries of crystal structures can be built and maintained and searched when processing clusters of pixels to determine if the image being processed corresponds to a sample. The library of data can also provide criteria for selecting the best points on these crystal structures to yield the best mass spectrometry data. Thus, the computer 64 has provided value-added data to the mass spectrometer 50 using image processing as feedback to improve the likelihood that the laser 52 will impinge a crystal on the plate 54 and provide meaningful data via the detector 58.

As stated previously, the mass spectrometry apparatus 40 of the present invention allows for the determination of where samples have actually been deposited on a plate, as opposed to the use of centers of spot positions on a plate where samples can merely be assumed to have been deposited, as in conventional mass spectrometers. Further, in accordance with the present invention, the mass spectrometer 50 aims the laser at different points selected for each sample, based on its structure, rather than merely pointing the laser at several predetermined points around a point on a plate that is presumed to coincide with a deposited sample.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A mass spectrometry apparatus comprising:
a laser for emitting a laser beam;
a controller for aiming said laser beam at a sample on a sample plate for mass spectrometry analysis;
a camera having a field of view comprising the sample on the sample plate, said laser targeting a portion of the sample for laser impingement;
a processing device configured to:
receive an image of the sample from said camera;
analyze the image of the sample to generate control signals for use by said controller to direct the manner in which said laser beam impinges said sample plate and the sample;
said processing device being operable to: identify locations on the sample based on an evaluation of characteristics of the sample; and provide position data in said control signals that correspond to said locations; and
wherein said position data is for said controller to aim said laser at said locations for laser impingement.

2. A mass spectrometry apparatus as set forth in claim 1, wherein said processing device is operable to identify locations corresponding to a crystalline structure within the sample on said sample plate, said crystalline structure selected from the group consisting of a thin crystal, a hair-like crystal, and a crystal having at least one finger-like appendage.

3. A mass spectrometry apparatus as set forth in claim 2, wherein said processing device automatically evaluates the image of the sample on said sample plate and automatically provides signals to said controller for aiming and firing said laser.

4. A mass spectrometry apparatus as set forth in claim 1, wherein said image comprises pixels, said pixels being characterized by respective values corresponding to different levels of brightness, said processing device operable to:
select a minimum brightness level such that said pixels having a value less than said minimum brightness level are determined to not belong to one of said samples; and
analyze groups of said pixels having values above said minimum brightness level to locate clusters of said pixels that correspond to one of said samples.

5. A mass spectrometry apparatus as set forth in claim 4, wherein said processing device is further operable to generate said position data by determining an approximate centroid for at least one of said clusters.

6. A mass spectrometry apparatus as claimed in claim 5, further comprising a monitor for displaying the image of the sample and an output device for providing said position data to said controller.

7. A mass spectrometry apparatus as claimed in claim 1, wherein said samples are characterized by crystal structures, said processing device being operable to identify points on the samples at which to direct said laser, said points varying among the samples depending on their respective structures, said processing device providing data relating to said points in said control signals.

8. A mass spectrometry apparatus as claimed in claim 7, further comprising an input device for providing said position data relating to said points to said controller.

9. A mass spectrometry apparatus as claimed in claim 8, wherein said controller is operable to use said control signals to move said sample plate relative to said laser.

10. A mass spectrometry apparatus as claimed in claim 1, wherein said mass spectrometry apparatus is operated in conjunction with a frame grabber and has a monitor for displaying an output signal generated by said camera, said mass spectrometry device providing an output from said monitor to said frame grabber to facilitate generating said image.

11. A mass spectrometry apparatus as claimed in claim 1, wherein said position data is defined as coordinates, said processing device being operable to store said coordinates in a file having a file format that is compatible with said mass spectrometry apparatus, said controller being operable to move at least one of said sample plate and said laser to impinge said sample plate at locations corresponding to said coordinates provided in said file.

12. A mass spectrometry apparatus as claimed in claim 11, further comprising a monitor operable to receive an output signal from said camera, and a frame grabber connected to said monitor to generate said image and provide said image to said processing device.

* * * * *